US012644531B2

(12) United States Patent
Shi et al.

(10) Patent No.: US 12,644,531 B2
(45) Date of Patent: Jun. 2, 2026

(54) VALVE DEVICE AND ELECTRIC VALVE

(71) Applicant: ZHEJIANG SANHUA AUTOMOTIVE COMPONENTS CO., LTD., Hangzhou (CN)

(72) Inventors: Ying Shi, Hangzhou (CN); Rongjun Zhang, Hangzhou (CN); Yiyuan Pan, Hangzhou (CN)

(73) Assignee: ZHEJIANG SANHUA AUTOMOTIVE COMPONENTS CO., LTD., Hangzhou (CN)

( * ) Notice: Subject to any disclaimer, the term of this patent is extended or adjusted under 35 U.S.C. 154(b) by 5 days.

(21) Appl. No.: 18/833,417

(22) PCT Filed: Jan. 10, 2023

(86) PCT No.: PCT/CN2023/071667
§ 371 (c)(1),
(2) Date: Jul. 26, 2024

(87) PCT Pub. No.: WO2023/143073
PCT Pub. Date: Aug. 3, 2023

(65) Prior Publication Data
US 2025/0146591 A1      May 8, 2025

(30) Foreign Application Priority Data
Jan. 27, 2022    (CN) .......................... 202210102507.2

(51) Int. Cl.
*F16K 27/10*          (2006.01)
*F16J 15/38*          (2006.01)
(Continued)

(52) U.S. Cl.
CPC ............. *F16K 27/102* (2013.01); *F16J 15/38* (2013.01); *F16K 1/38* (2013.01); *F16K 1/42* (2013.01);
(Continued)

(58) Field of Classification Search
USPC ...................................................... 251/129.11
See application file for complete search history.

(56) References Cited

U.S. PATENT DOCUMENTS 3,061,319 A * 10/1962 Snyder ...................... F16J 15/38
                                                        277/380
4,412,517 A * 11/1983 Kobashi ................... H02K 7/06
                                                        123/588
(Continued)

FOREIGN PATENT DOCUMENTS

CN          208794791 U       4/2019
CN          210234648 U       4/2020
(Continued)

OTHER PUBLICATIONS

International Search Report for PCT/CN2023/071667 mailed Mar. 27, 2023, ISA/CN.

*Primary Examiner* — Matthew W Jellett
(74) *Attorney, Agent, or Firm* — Yue (Robert) Xu; Apex Attorneys at Law, LLP

(57) ABSTRACT

Provided are a valve device and an electric valve. A valve seat component comprises a valve seat sleeve and a flange portion, wherein an opening portion at the lower end of a sleeve is welded and fixed to the valve seat sleeve. The valve device further comprises a mounting block. The valve device is mounted on another component by means of the mounting block. The mounting block is further provided with a mounting hole in which part of the valve seat component is located. The diameter of at least part of the mounting hole is less than the outer diameter of the flange portion. The flange portion limits the mounting block to be separated from the valve seat component in a direction away from a coil assembly.

16 Claims, 12 Drawing Sheets

(51) Int. Cl.
*F16K 1/38* (2006.01)
*F16K 1/42* (2006.01)
*F16K 27/02* (2006.01)
*F16K 31/06* (2006.01)

(52) U.S. Cl.
CPC ........ *F16K 27/0254* (2013.01); *F16K 27/029* (2013.01); *F16K 31/0655* (2013.01)

(56) References Cited

U.S. PATENT DOCUMENTS

| | | | | | |
|---|---|---|---|---|---|
| 4,480,614 | A * | 11/1984 | Kobashi | ................. | F02M 3/075 |
| | | | | | 123/588 |
| 5,060,910 | A * | 10/1991 | Iwata | ...................... | F16K 31/04 |
| | | | | | 251/266 |
| 5,351,935 | A * | 10/1994 | Miyoshi | ................. | F02M 26/54 |
| | | | | | 251/129.05 |
| 6,224,034 | B1 * | 5/2001 | Kato | ........................ | H02K 7/06 |
| | | | | | 251/129.13 |
| 6,460,567 | B1 * | 10/2002 | Hansen, III | ............. | F16K 31/04 |
| | | | | | 137/625.48 |
| 6,561,480 | B1 * | 5/2003 | Komiya | ................. | F25B 41/347 |
| | | | | | 251/129.05 |
| 6,691,980 | B2 * | 2/2004 | Larsen | ...................... | F16K 1/00 |
| | | | | | 251/129.11 |
| 7,523,917 | B2 * | 4/2009 | Arai | ........................ | F16K 31/04 |
| | | | | | 251/248 |
| 8,851,448 | B2 * | 10/2014 | Harada | ................... | F16K 31/53 |
| | | | | | 251/85 |
| 2010/0108925 | A1 * | 5/2010 | Kannoo | ................ | F16K 11/074 |
| | | | | | 251/129.11 |
| 2014/0291562 | A1 * | 10/2014 | Ooe | ........................ | F25B 41/35 |
| | | | | | 251/129.11 |
| 2015/0001428 | A1 * | 1/2015 | Xu | .......................... | F25B 9/145 |
| | | | | | 137/625.15 |
| 2016/0273654 | A1 * | 9/2016 | Yu | .......................... | F16J 15/106 |
| 2023/0160497 | A1 * | 5/2023 | Zhou | ...................... | F16K 27/00 |
| | | | | | 251/129.11 |

FOREIGN PATENT DOCUMENTS

| | | |
|---|---|---|
| CN | 212718008 U | 3/2021 |
| CN | 113404913 A | 9/2021 |
| JP | 2008273507 A | 11/2008 |

* cited by examiner

VALVE DEVICE AND ELECTRIC VALVE

This disclosure is a national phase application of PCT international patent application PCT/CN2023/071667, filed on Jan. 10, 2023 which claims the priority to Chinese Patent Disclosure No. 202210102507.2, titled "VALVE DEVICE AND ELECTRIC VALVE", filed with the China National Intellectual Property Administration on Jan. 27, 2022, which are incorporated herein by reference in its entirety.

FIELD

The present disclosure relates to the technical field of fluid control, and in particular to a valve device and an electric valve having the same.

BACKGROUND

An electric valve includes a valve component, a mounting block and a valve body, and the valve component and the mounting block are in a separate structure. The mounting block is provided with a through hole, and a screw assembly passes through the through hole and is screwed into a threaded hole on the valve body to fix the mounting block to the valve body. The mounting block abuts against the valve component to limit a position of the valve component in an axial direction. However, this arrangement cannot prevent the valve component from rotating relative to the mounting block or the valve body in a circumferential direction. Therefore, a technical problem to be solved by those skilled in the art is how to reliably fix the valve component relative to the mounting block or the valve body.

SUMMARY

An object of the present disclosure is to provide a valve device and an electric valve, which are beneficial to preventing a valve component from rotating relative to a mounting block or a valve body in a circumferential direction, to facilitate the mounting of the valve device.

To achieve the above object, the following technical solutions are provided according to the present disclosure.

A valve device includes a coil assembly and a valve component. The valve component includes a valve seat component, a rotor component, a valve core component and a sleeve. The coil assembly includes a stator assembly, and the stator assembly is configured to drive the rotor component to rotate. The valve core component is connected to the rotor component, and the rotor component is configured to drive the valve core component to axially move relative to the valve seat component.

The valve seat component includes a valve seat sleeve and a flange portion. A lower end opening portion of the sleeve is fixed to the valve seat sleeve by welding. The valve device further includes a mounting block, and the valve device is mounted to another element through the mounting block. The mounting block is provided with a mounting hole, and a part of the valve seat component is located inside the mounting hole. A hole diameter of at least a part of the mounting hole is smaller than an outer diameter of the flange portion, and the flange portion limits the mounting block from being separated from the valve seat component in a direction away from the coil assembly. The valve device further includes a gasket, and at least a part of the gasket is located between the valve seat component and an inner circumferential wall of the mounting hole. The gasket is tightly pressed between the mounting block and the valve seat component in an interference fit with the mounting block and the valve seat component to limit the valve seat component from rotating relative to the mounting block in a circumferential direction.

An electric valve includes the above valve device, and further includes a valve body. The valve body has a valve body cavity, and a part of the valve device is located inside the valve body cavity. The mounting block is provided with a second communication hole, and the valve body is provided with a second threaded hole. The electric valve further includes a second screw assembly, and the second screw assembly passes through the second communication hole and is screwed into the second threaded hole on the valve body. A lower end face of the flange portion abuts against the valve body, and the mounting block abuts against an upper end face of the flange portion, to fix the valve device to the valve body.

In an embodiment provided according to the present disclosure, the valve seat component includes a valve seat sleeve and a flange portion. The lower end opening portion of the sleeve is fixed to the valve seat sleeve by welding. The valve device further includes the mounting block, and the valve device is mounted to other elements through the mounting block. The mounting block is provided with the mounting hole, and a part of the valve seat component is located inside the mounting hole. The hole diameter of at least a part of the mounting hole is smaller than the outer diameter of the flange portion, and the flange portion limits the mounting block from being separated from the valve seat component in the direction away from the coil assembly. The valve device further includes the gasket, and at least a part of the gasket is located between the valve seat component and the inner circumferential wall that forms the mounting hole. The gasket is tightly pressed between the mounting block and the valve seat component in an interference fit to prevent the valve seat component from rotating relative to the mounting block in the circumferential direction. With this arrangement, the valve component is prevented from rotating relative to the mounting block or the valve body in the circumferential direction, thereby facilitating the mounting of the valve device.

DETAILED DESCRIPTION OF THE EMBODIMENTS

Figure 1:
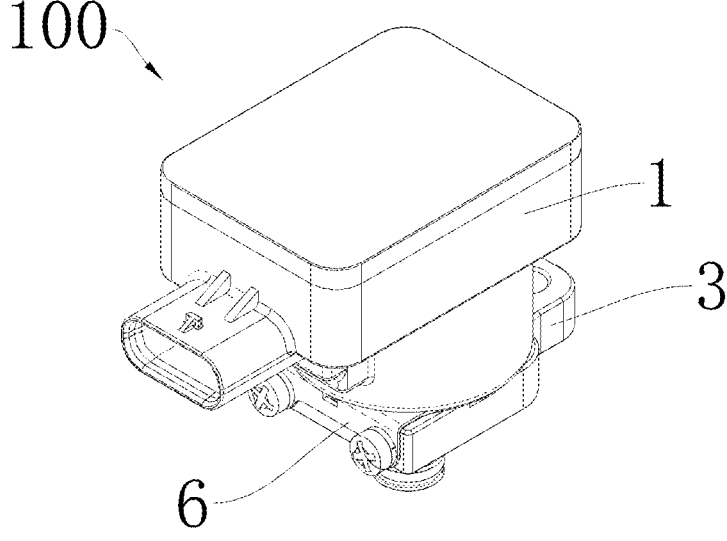
FIG. 1 is a schematic perspective view showing a structure of a valve device according to a first embodiment of the present disclosure from a perspective.
Figure 2:
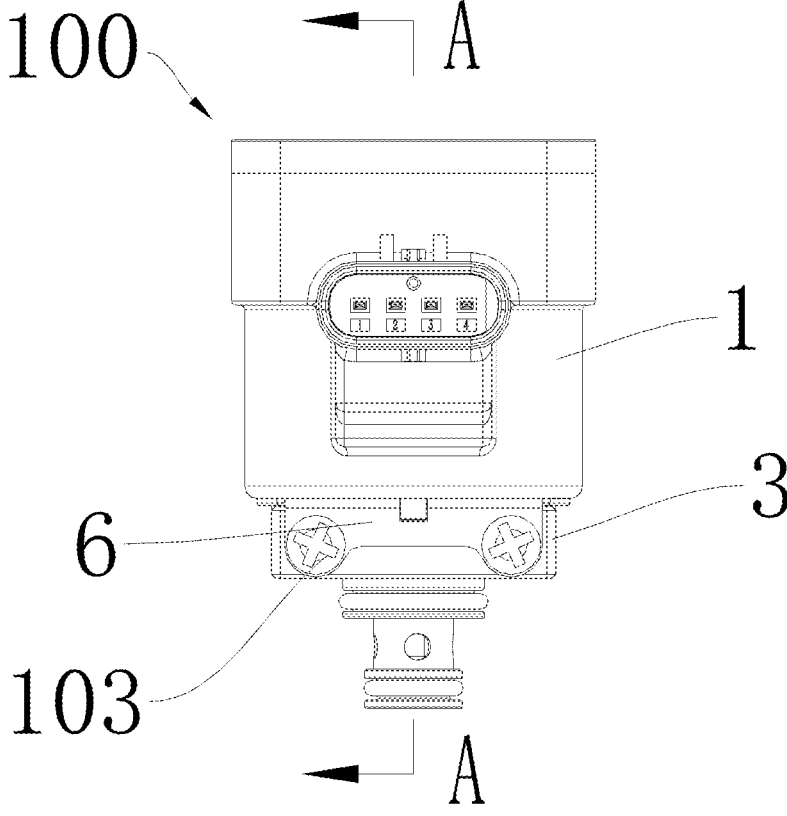
FIG. 2 is a schematic front view showing the structure of the valve device in FIG. 1.

The present disclosure is further described as follows in conjunction with the drawings and specific embodiments.

Referring to FIG. 1 to FIG. 8, and FIG. 22, an embodiment of a valve device 100 is illustrated. The valve device 100 may be mounted to other elements, such as a valve body 101, a heat exchange core and the like. The valve device 100 includes a coil assembly 1 and a valve component 2. The coil assembly 1 includes a stator assembly 11 and an injection molding portion 12. The injection molding portion 12 covers at least a part of the stator assembly 11. The coil assembly 1 is provided with an accommodation cavity 13, and a lower end of the accommodation cavity 13 is open. The valve component 2 includes a valve seat component 21, a rotor component 22, a valve core component 23, a nut assembly 24 and a sleeve 25. At least a part of the sleeve 25 is located inside the accommodation cavity 13. The sleeve 25 includes a top portion 251 and a lower end opening portion 252, and the lower end opening portion 252 of the sleeve 25 is fixed to the valve seat component 21 by welding. The stator assembly 11 is arranged outside the sleeve 25, and the rotor component 22 is arranged inside the sleeve 25. A preset current is applied to the stator assembly 11 to generate an excitation magnetic field so as to drive the rotor component 22 to rotate. The valve core component 23 is connected to the rotor component 22, and the rotor component 22 drives the valve core component 23 to rotate. The valve core component 23 is in thread fit with the nut assembly 24, and the rotation of the rotor component 22 is converted to an axial movement of the valve core component 23 relative to the valve seat component 21.

Figure 3:
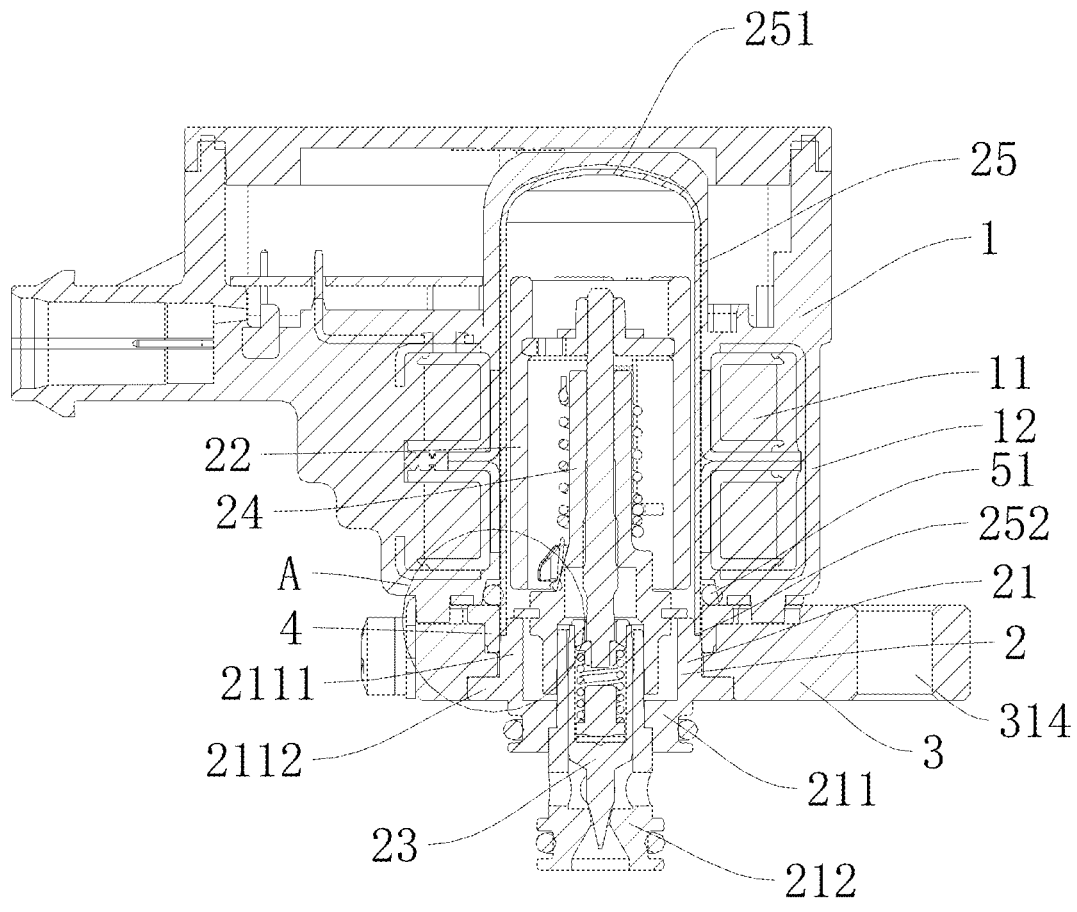
FIG. 3 is a schematic cross-sectional view showing the structure of the valve device taken along a line A-A in FIG. 2.
Figure 4:
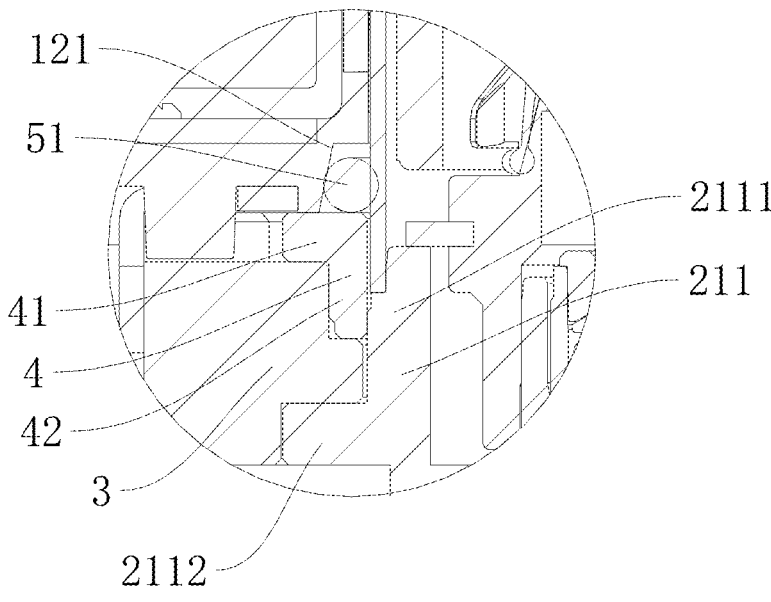
FIG. 4 is a schematic enlarged view showing the structure of a part A in FIG. 3.
Figure 5:
FIG. 5 is a schematic front view showing a structure of a coil assembly in FIG. 1.
Figure 5:
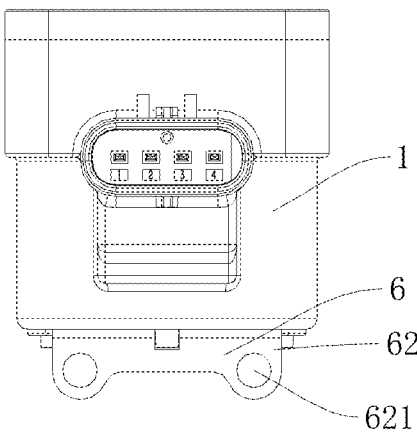
Figure 5:
Figure 6:
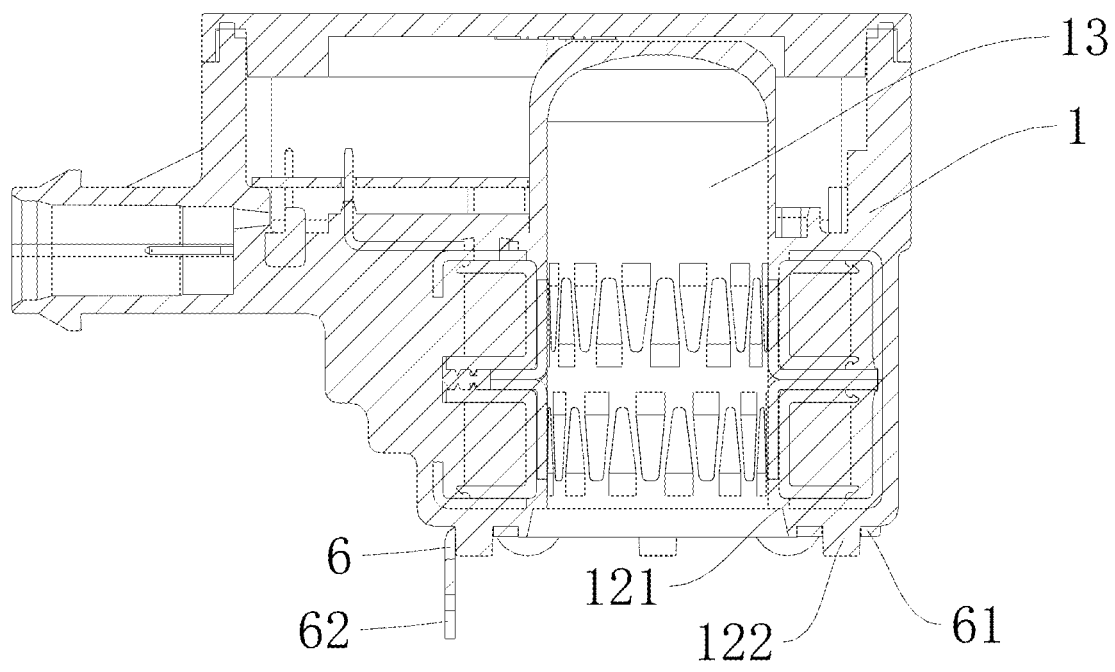
FIG. 6 is a schematic sectional view showing the structure of the coil assembly taken along a line B-B in FIG. 5.
Figure 7:
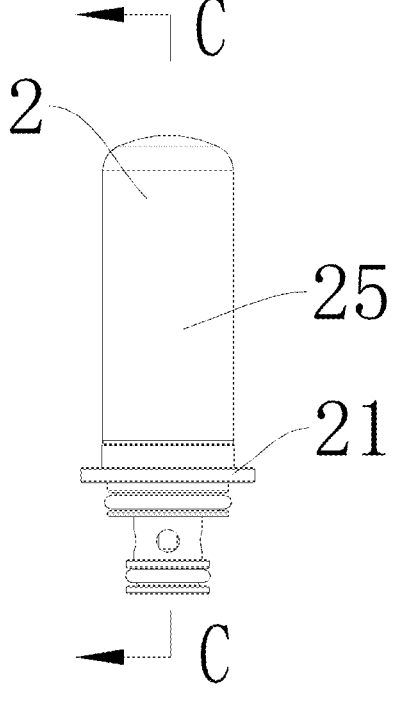
FIG. 7 is a schematic front view showing a structure of a valve component in FIG. 1.
Figure 8:
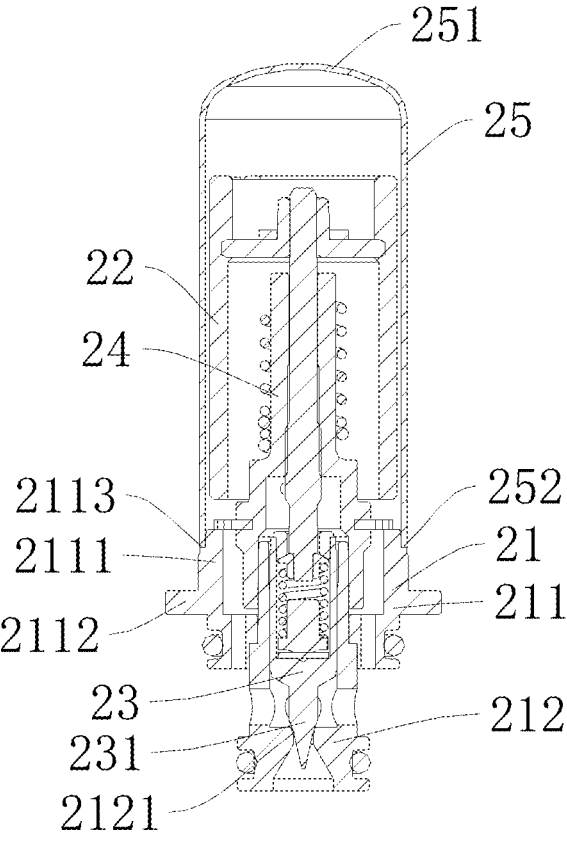
FIG. 8 is a schematic sectional view showing the structure of the valve component taken along a line C-C in FIG. 7.
Figure 9:
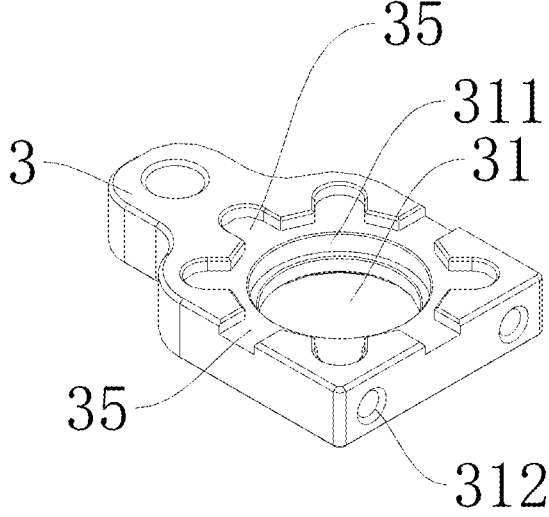
FIG. 9 is a schematic perspective view showing a structure of a mounting block in FIG. 1 from a perspective.
Figure 10:
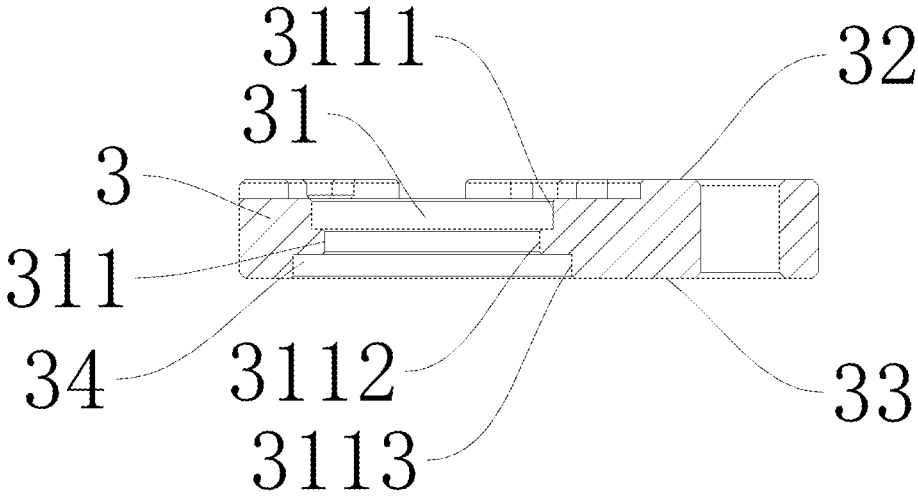
FIG. 10 is a schematic cross-sectional view showing the structure of the mounting block in FIG. 9 from a perspective.
Figure 11:
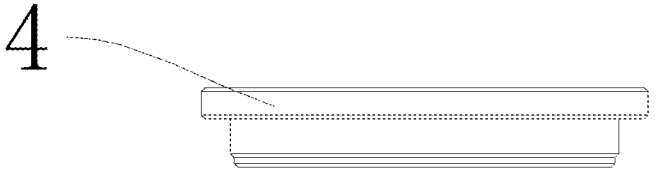
FIG. 11 is a schematic view showing a structure of a gasket in FIG. 1 from a perspective.
Figure 12:
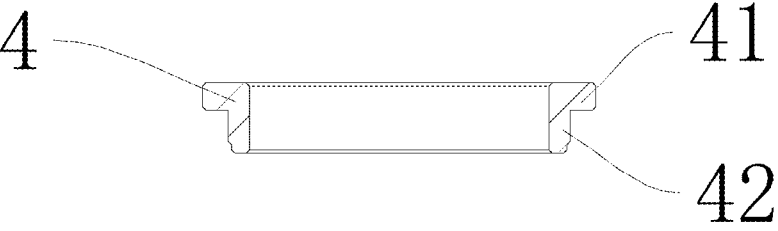
FIG. 12 is a schematic cross-sectional view showing the structure of the gasket in FIG. 11 from a perspective.
Figure 13:
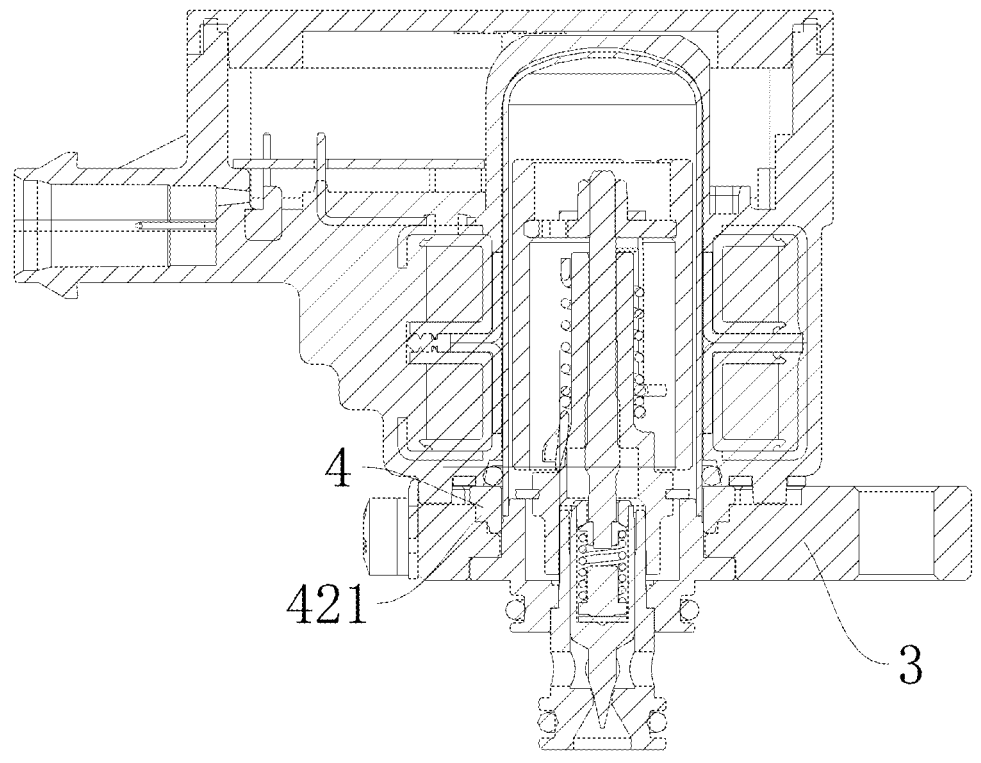
FIG. 13 is a schematic cross-sectional view showing a structure of a valve device according to a second embodiment of the present disclosure from a perspective.
Figure 14:
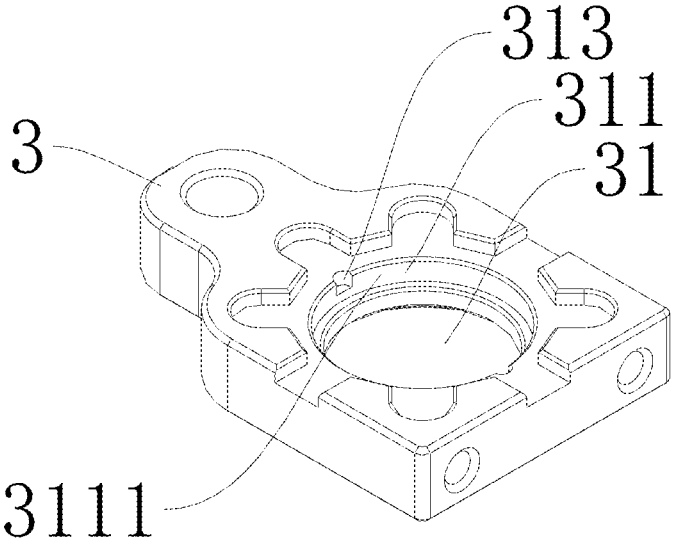
FIG. 14 is a schematic perspective view showing the structure of a mounting block in FIG. 13 from a perspective.
Figure 15:
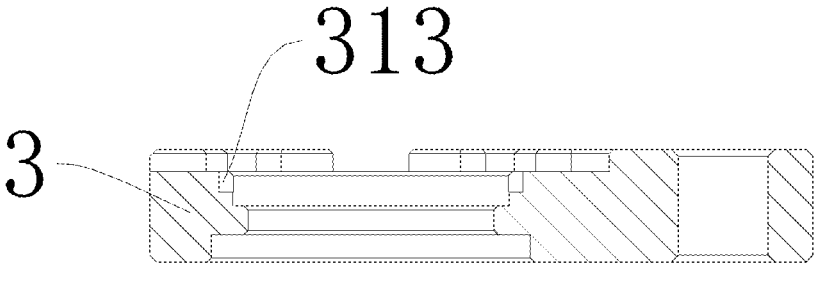
FIG. 15 is a schematic cross-sectional view showing the structure of the mounting block in FIG. 14 from a perspective.
Figure 16:
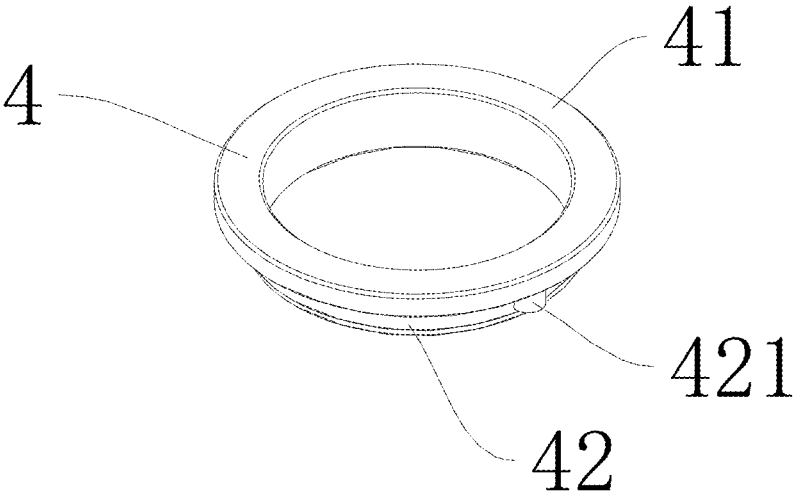
FIG. 16 is a schematic perspective view showing the structure of a gasket in FIG. 13 from a perspective.

Referring to FIG. 3 and FIG. 8, the valve seat component 21 includes a valve seat portion 211 and a valve port seat portion 212. The valve seat portion 211 and the valve port seat portion 212 are formed separately and fixedly connected with each other by welding, riveting or other means. In other embodiments, the valve seat portion 211 and the valve port seat portion 212 may be integrally formed. A valve port 2121 is formed at the valve port seat portion 212. The valve core component 23 is provided with a valve needle portion 231. The valve needle portion 231 can open or close the valve port 2121, or regulate a flow area of the valve port 2121 to regulate a flow rate at the valve port 2121.

Referring to FIG. 3 and FIG. 8, the valve seat portion 211 includes a valve seat sleeve 2111 and a flange portion 2112, and an outer diameter of the flange portion 2112 is larger than an outer diameter of the valve seat sleeve 2111. The lower end opening portion 252 of the sleeve 25 is fixed to the valve seat sleeve 2111 by welding, which forms a first welded seam 2113.

Referring to FIG. 3 to FIG. 10, and FIG. 22, the valve device 100 further includes a mounting block 3. The valve device 100 is mounted to other elements through mounting block 3, where the other elements include a valve body 101, a heat exchange core and the like. The mounting block 3 is provided with a mounting hole 31, and a part of the valve seat component 21 is located inside the mounting hole 31. A hole diameter of at least a part of the mounting hole 31 is smaller than an outer diameter of the flange portion 2112, and the flange portion 2112 is configured to prevent the mounting block 3 from being separated from the valve seat component 21 in a direction away from the coil assembly 1. The valve device 100 further includes a gasket 4, and at least a part of the gasket 4 is located between the valve seat component 21 and an inner circumferential wall of the mounting hole 31. The gasket 4 is tightly pressed between the mounting block 3 and the valve seat component 21 in an interference fit to prevent the valve seat component 21 from rotating relative to the mounting block 3 in a circumferential direction. This arrangement facilitates of limiting the valve seat component 21 or the valve component 2 from rotating in a direction or an axial moving relative to the mounting block 3. The valve device 100 is firstly preassembled as a whole, which facilitates a transportation of the valve device 100. Then the valve device 100, as a whole, is fixedly connected to the valve body 101, the heat exchange core or other elements, thereby increasing a mounting efficiency. Moreover, after being mounted, the valve component 2 cannot rotate relative to the valve body 101 or the heat exchange core in the circumferential direction, and the positions of the respective parts are relatively fixed, which improves a reliability of the valve device 100.

Referring to FIG. 3 to FIG. 12, in a first embodiment of the valve device 100, a part of the valve seat portion 211 is located inside the mounting hole 31. The gasket 4 is in an annular cylinder shape. The gasket 4 includes a first gasket portion 41 and a second gasket portion 42, and an outer diameter of the first gasket portion 41 is larger than an outer diameter of the second gasket portion 42. The first gasket portion 41 is closer to the coil assembly 1 than the second gasket portion 42. The second gasket portion 42 is embedded between the mounting block 3 and the valve seat component 21 in an interference fit. An inner circumferential surface of the second gasket portion 42 is in contact with an outer circumferential surface of the valve seat sleeve 2111, and an outer circumferential surface of the second gasket portion 42 is in contact with the inner circumferential wall of the mounting hole 31. Specifically, in this embodiment, the mounting hole 31 has different hole diameters along an axial direction, namely a medium diameter, a small diameter and a large diameter from top to bottom. A mounting hole wall 311 of the mounting hole 31 includes a first side wall 3111, a second side wall and a third side wall. The medium diameter is in correspondence to the first side wall 3111, the small diameter is in correspondence to the second side wall 3112, and the large diameter is in correspondence to the third side wall 3113. The second gasket portion 42 is embedded between the first side wall 3111 and the valve seat sleeve 2111 in an interference fit with the first side wall 3111 and the valve seat sleeve 2111. The outer circumferential surface of the second gasket portion 42 is in contact with the first side wall 3111, and the inner circumferential surface of the second gasket portion 42 is in contact with the outer circumferential surface of the valve seat sleeve 2111, to limit the valve component 2 from rotating relative to the mounting block 3 in the circumferential direction. Certainly, in other embodiments, the mounting hole 31 may has no the small diameter. The small diameter is replaced by the medium diameter, and the first side wall 3111 is flush with the second side wall 3112. In this embodiment, the mounting block 3 includes a first face 32 and a second face 33. The first face 32 is an upper end face of the mounting block 3, and the second face 33 is a lower end face of the mounting block 3. A lower end face of a part of the first gasket portion 41 that protrudes from the second gasket portion 42 abuts against the first face 32 of the mounting block 3 to limit a relative position between the gasket 4 and the mounting block 3 and prevent the gasket 4 from being over press fitted when the gasket 4 is in the interference fit.

Referring to FIG. 3 to FIG. 12, in this embodiment, a recess portion 34 is formed at the lower end of the mounting block 3. A hole diameter of a side wall of the recess portion 34 is larger than the smallest diameter of the mounting hole 31. In this embodiment, the third side wall 3113 forms a side wall of the recess portion 34. At least a part of the flange portion 2112 is located inside the recess portion 34, and a top wall of the recess portion 34 abuts against an upper end face of the flange portion 2112. The flange portion 2112 can limit the mounting block 3 from being separated from the valve seat component 21 in the direction away from the coil assembly 1 so as to prevent the mounting block 3 from being separated from the valve component 2 in the direction away from the coil assembly 1. Certainly, in other embodiments, the third side wall 3113 may not be provided, that is, the recess portion 34 is not provided. The lower end face of the mounting block 3 is flat, and the lower end face of the mounting block 3 abuts against the upper end face of the flange portion 2112. With the recess portion 34, the height of the mounting block 3 or the height of the valve seat component 21 can be decreased to save materials while the connection strength of the mounting block 3 is ensured.

Referring to FIG. 3 to FIG. 12, in this embodiment, the valve device 100 further includes a first sealing ring 51, and the first sealing ring 51 is supported by a top portion of the gasket 4. The coil assembly 1 further includes an injection molding portion 12, and the injection molding portion 12 covers at least a part of the stator assembly 11. The coil assembly 1 is provided with an accommodation cavity 13, and a lower end of the accommodation cavity 13 is open. A lower end of the injection molding portion 12 is provided with an annular groove portion 121 that has an annular groove. At least a part of the first sealing ring 51 is located in the annular groove, and an opening of the annular groove is arranged toward the sleeve 25. The first sealing ring 51 is tightly pressed between an inner side wall of the annular groove portion 121 and the sleeve 25, i.e. pressed between the inner side wall of the annular groove portion 121 and an outer side wall of the sleeve 25. As such, water, gas or other mediums can be prevented from entering a gap between the coil assembly 1 and the sleeve 25, thereby reducing the corrosion risk of the parts of the coil assembly 1, and improving the service life of the valve device 100.

Referring to FIG. 3 to FIG. 12, in this embodiment, the gasket 4 covers a position where the sleeve 25 and the valve seat sleeve 2111 are welded. Specifically, the second gasket portion 42 of the gasket 4 covers the first welded seam 2113 formed by the lower end opening portion 252 of the sleeve 25 and the valve seat sleeve 2111 being welded. A lowermost end of the gasket 4 is located below the first welded seam 2113, and an uppermost end of the gasket 4 is located above the first welded seam 2113. At least a part of the inner circumferential surface of the second gasket portion 42 abuts against the outer circumferential surface of the valve seat sleeve 2111. With this arrangement, the first welded seam 2113 is less likely to be exposed to the exterior, therefore the first welded seam 2113 is protected, and the corrosion risk of the weld is reduced. Furthermore, water, gas and other mediums are less likely to enter the gap between the coil assembly 1 and the sleeve 25.

Referring to FIG. 3 to FIG. 12, in this embodiment, the valve device 100 further includes a connector 6, and the connector 6 includes a main plate portion 61 and a side plate portion 62. The main plate portion 61 and the side plate portion 62 are formed as a one-piece structure. The side plate portion 62 is bent from the main plate portion 61 toward the direction away from the coil assembly 1, and the main plate portion 61 is fixedly connected to the coil assembly 1. In this embodiment, specifically, the main plate portion 61 is substantially in an annular plate shape. A lower end of the injection molding portion 12 is provided with multiple columns 122, and the main plate portion 61 is provided with multiple first through holes. Positions of the columns 122 are in one-to-one correspondence to positions of the first through holes. Each of the columns 122 passes through the corresponding first through hole, and a part of the column 122 that passes through the first through hole is welded to fix the main plate portion 61 to the injection molding portion 12. In this embodiment, only half of the columns 122 are welded. Certainly, in other embodiments, all or a certain number of the columns 122 may be welded.

Referring to FIG. 3 to FIG. 12, in this embodiment, the side plate portion 62 of the connector 6 is provided with a first communication hole 621, and the mounting block 3 is provided with a first threaded hole 312. The valve device 100 is further provided with a first screw assembly 103, and the first screw assembly 103 passes through the first communication hole 621 and is screwed into the first threaded hole 312 on the mounting block 3 so as to fixedly connect the connector 6 and the mounting block 3. In other embodiments, the connector 6 and the mounting block 3 may be fixedly connected by snap fit, welding, bonding or other means. The upper end face of the mounting block 3, i.e. the first face 32, is provided with an avoidance groove 35, and the position of the avoidance groove 35 is in correspondence to the position of the multiple columns 122. A part of each of the columns 122 is accommodated in the avoidance groove 35, thereby preventing the mounting block 3 from interfering with the columns 122, and reducing the weight of the mounting block 3.

Referring to FIG. 13 to FIG. 16, compared with the first embodiment of the valve device 100, in a second embodiment of the valve device 100, the gasket 4 in this embodiment also includes a first gasket portion 41 and a second gasket portion 42, and an outer diameter of the first gasket portion 41 is larger than an outer diameter of the second gasket portion 42. The difference lies in that, a periphery of the second gasket portion 42 is provided with a first ridge 421 arranged along an axial direction of the valve component 2, and a circumferential side wall of the mounting hole 31 is provided with a first elongated groove 313 arranged along the axial direction of the valve component 2. Specifically, in this embodiment, the first elongated groove 313 is formed on the first side wall 3111, and the shape of the first ridge 421 matches with an inner peripheral wall of the first elongated groove 313. The first ridge 421 is in interference fit with the inner peripheral wall of the first elongated groove 313, and the inner circumferential surface of the gasket 4 is in interference fit with the outer circumferential surface of the valve seat sleeve 2111, to prevent the valve seat component 21 from rotating relative to the mounting block 3 in the circumferential direction. Certainly, in other embodiments, the first ridge 421 may be a columnar protrusion, a conical protrusion or other forms. Other parts are substantially the same as those of the valve device 100 in the first embodiment, which is not repeated herein.

In a variation of the second embodiment, the inner circumferential surface of the gasket 4 is provided with a second ridge arranged along the axial direction of the valve component 2, and the valve seat sleeve 2111 is provided with a second elongated groove arranged along the axial direction of the valve component 2. The second ridge is in interference fit with an inner peripheral wall of the second elongated groove to also prevent the valve seat component 21 from rotating relative to the mounting block 3 in the circumferential direction.

In a third embodiment of the valve device 100, compared with the second embodiment of the valve device 100, the periphery of the second gasket portion 42 is provided with a third elongated groove arranged along the axial direction of the valve component 2, and the circumferential side wall of the mounting hole 31 is provided with a third ridge arranged along the axial direction of the valve component 2. Specifically, the third ridge is formed on the first side wall 3111, and the shape of the third ridge matches with an inner peripheral wall of the third elongated groove. The third ridge is in interference fit with the inner peripheral wall of the third elongated groove, and the inner circumferential surface of the gasket 4 is in interference fit with the outer circumferential surface of the valve seat sleeve 2111, so as to also prevent the valve seat component 21 from rotating relative to the mounting block 3 in the circumferential direction. Other parts are substantially the same as those of the valve device 100 in the first embodiment, which is not repeated herein.

In a variation of the third embodiment, alternatively, the inner circumferential surface of the gasket 4 is provided with a fourth elongated groove arranged along the axial direction of the valve component 2, and the valve seat sleeve 2111 is provided with a fourth elongated groove arranged along the axial direction of the valve component 2. The fourth ridge is in interference fit with an inner peripheral wall that forms the fourth elongated groove, so as to also prevent the valve seat component 21 from rotating relative to the mounting block 3 in the circumferential direction.

Figure 17:
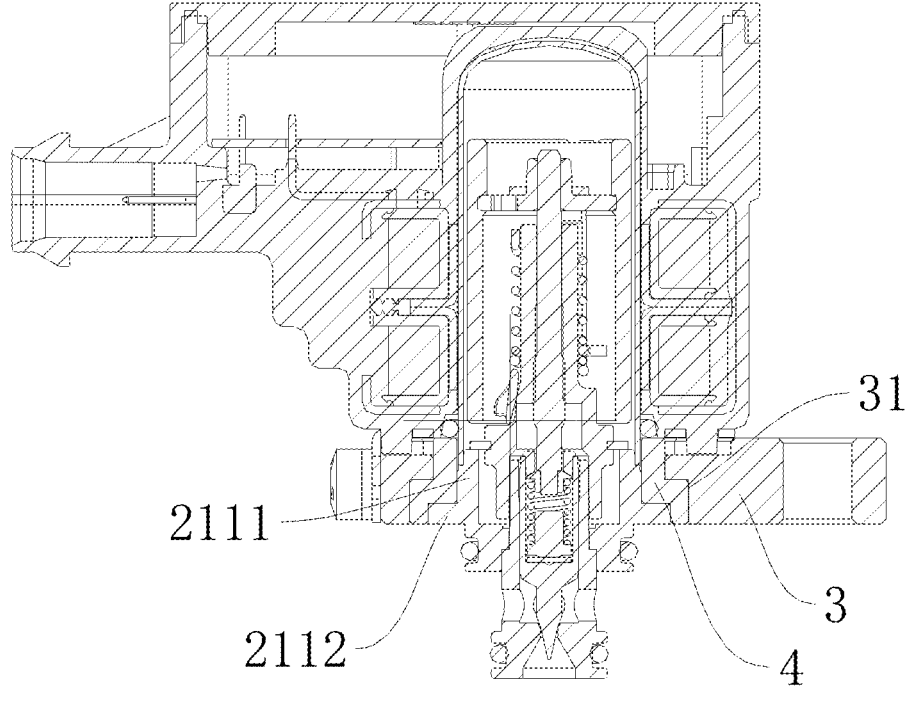
FIG. 17 is a schematic cross-sectional view showing a structure of a valve device according to a third embodiment of the present disclosure from a perspective.
Figure 18:
FIG. 18 is a schematic view showing the structure of a gasket in FIG. 17 from a perspective.
Figure 19:
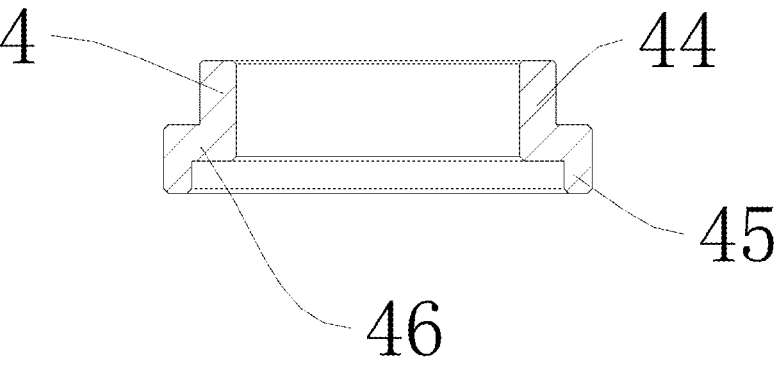
FIG. 19 is a schematic cross-sectional view showing the structure of the gasket in FIG. 18 from a perspective.

Referring to FIG. 17 to FIG. 19, compared with the valve devices 100 described above, in a fourth embodiment of the valve device 100, the gasket 4 according to this embodiment includes a large-diameter cylindrical portion 45 and a small-diameter cylindrical portion 44, and the small-diameter cylindrical portion 44 is closer to the coil assembly 1 than the large-diameter cylindrical portion 45. A turning portion 46 is provided between the large diameter cylindrical portion 45 and the small diameter cylindrical portion 44. A lower end face of the turning portion 46 abuts against the upper end face of the flange portion 2112, and the mounting block 3 abuts against an upper end face of the turning portion 46. At least a part of the small-diameter cylindrical portion 44 is pressed between the valve seat sleeve 2111 and the inner circumferential wall of the mounting hole 31 in an interference fit. At least a part of the large-diameter cylindrical portion 45 is pressed between an outer circumferential surface of the flange portion 2112 and the inner circumferential wall of the mounting hole 31 in an interference fit. This arrangement prevents the valve seat component 21 from rotating in the circumferential direction or axially moving relative to the mounting block 3. The gasket 4 covers the position where the sleeve 25 and the valve seat sleeve 2111 are welded. Specifically, in this embodiment, the small-diameter cylindrical portion 44 covers the first welded seam 2113 formed by the sleeve 25 and the valve seat sleeve 2111 being welded. Other parts are substantially the same as those of the valve device 100 in the first embodiment, which is not repeated herein.

In the embodiments of the valve device 100 described above, the joint between the gasket 4 and the mounting block 3 or between the gasket 4 and the valve component 2 may be further fixed by bonding or welding to further increase the connection reliability. Alternatively, the mounting block 3 and the valve seat portion 211 may be further bonded by adhesives to also increase the connection reliability.

Figure 20:
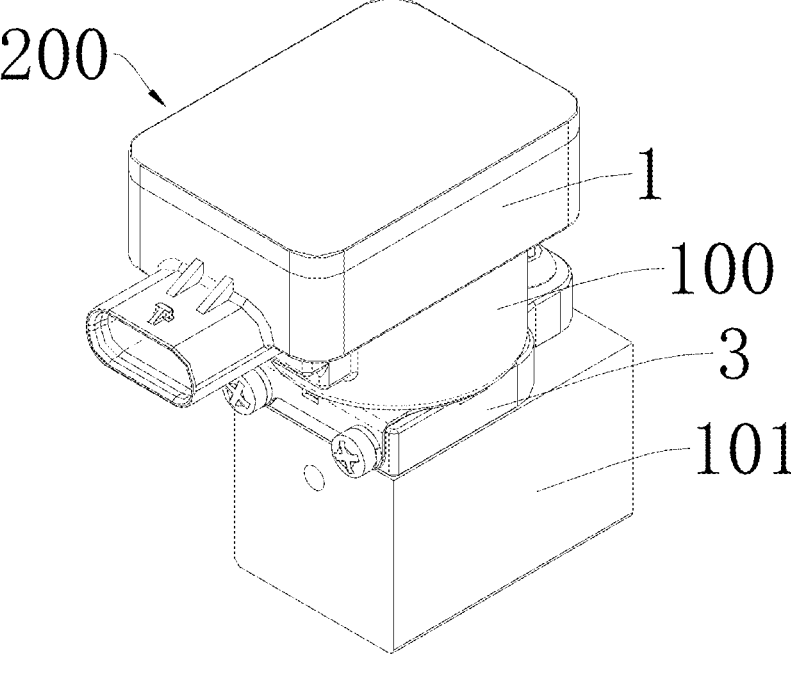
FIG. 20 is a schematic perspective view showing a structure of an electric valve according to an embodiment of the present disclosure.
Figure 21:
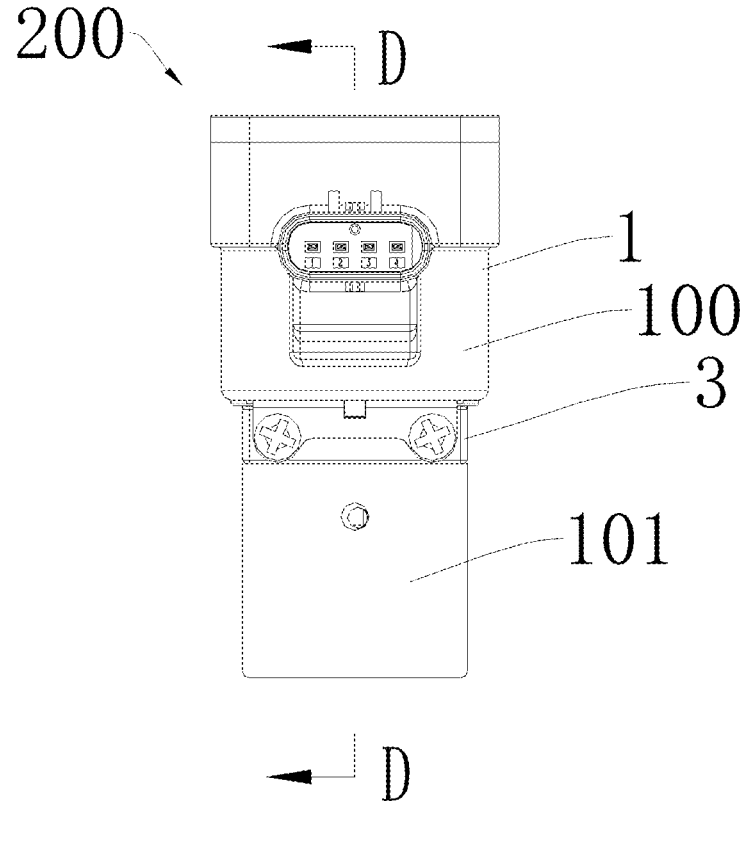
FIG. 21 is a schematic front view showing the structure of the electric valve in FIG. 20.
Figure 22:
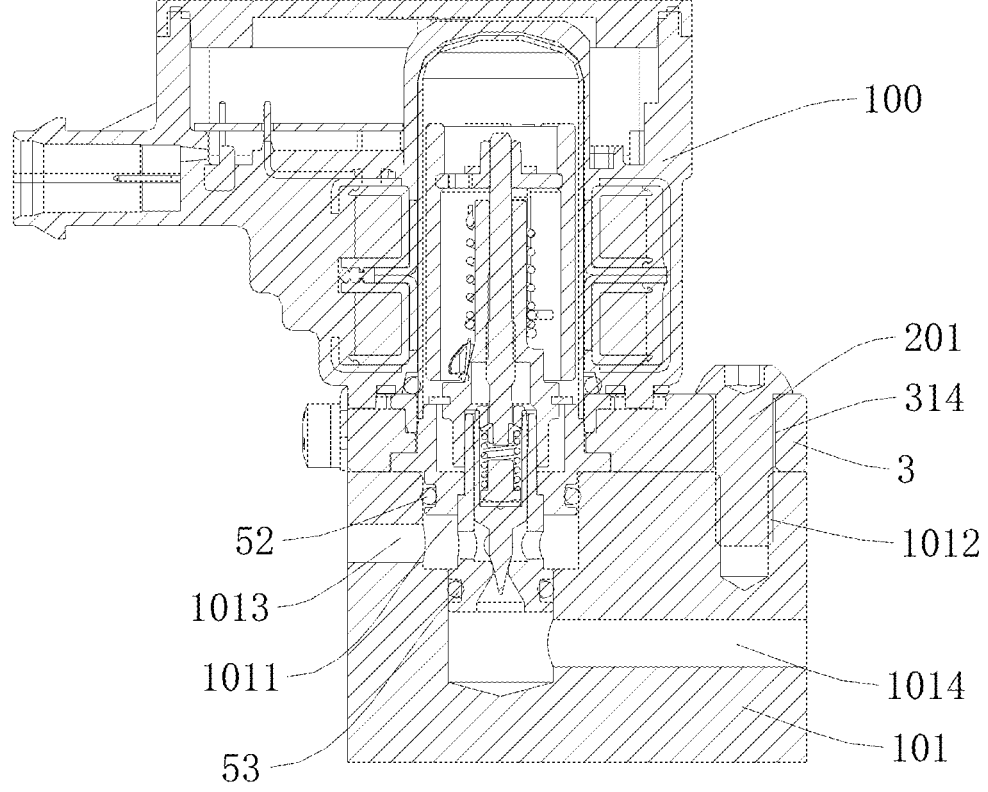
FIG. 22 is a schematic cross-sectional view showing the structure of the electric valve taken along a line D-D in FIG. 20.

Referring to FIG. 20 to FIG. 22, an embodiment of an electric valve 200 is further provided according to the present disclosure. The electric valve 200 includes the valve device 100 described above. The electric valve includes a valve body 101. The valve bod 101 is provided with a valve body cavity 1011, and a part of the valve device 100 is located inside the valve body cavity 1011. The mounting block 3 is provided with a second communication hole 314, and the valve body 101 is provided with a second threaded hole 1012. The electric valve 200 further includes a second screw assembly 201, and the second screw assembly 201 passes through the second communication hole 314 and is screwed into the second threaded hole 1012 on the valve body 101. The lower end face of the flange portion 2112 abuts against the valve body 101, and the mounting block 3 abuts against the upper end face of the flange portion 2112, so as to fix the valve device 100 to the valve body 101. After the valve device 100 is fixed to the valve body 101, the positions of the respective parts are relatively fixed.

Referring to FIG. 20 to FIG. 22, in this embodiment, the valve body 101 includes a first flow passage 1013 and a second flow passage 1014, and the first flow passage 1013 is in communication with the second flow passage 1014 through the valve device 100. The valve device 100 regulates a flow rate of a working medium between the first flow passage 1013 and the second flow passage 1014 by cooperation of the valve core component 23 and the valve port 2121, where the working medium includes a refrigerant. In this embodiment, a second sealing ring 52 is provided between a side wall of the valve body cavity 1011 and the valve seat portion 211. A third sealing ring 53 is provided between the side wall that forms the valve body cavity 1011 and the valve port seat portion 212. The second sealing ring 52 and the third sealing ring 53 can prevent the leakage of the working medium.

An embodiment of a heat exchange device (not shown in the drawings) is further provided in the present disclosure. The heat exchange device includes the valve device 100 described above, and a heat exchange core. The heat exchange core has a heat exchange core cavity, and a part of the valve device 100 is located inside the heat exchange core cavity. The mounting block 3 is provided with a second communication hole 314, and the heat exchange core is provided with a second threaded hole. The heat exchange core further includes a second screw assembly, and the second screw assembly passes through the second communication hole and is screwed into the second threaded hole on the heat exchange core. The lower end face of the flange portion abuts against the heat exchange core, and the mounting block 3 abuts against the upper end face of the flange portion 2112, so as to fix the valve device 100 to the heat exchange core. After the valve device 100 is fixed to the heat exchange core, the positions of the respective parts are relatively fixed.

In this embodiment, the heat exchange core includes a first flow passage and a second flow passage, and the first flow passage is not in communication with the second flow passage. A coolant flows through the first flow passage, and a refrigerant flows through the second flow passage. The valve device 100 is mounted to the heat exchange core, and the valve device 100 regulates a flow rate of the refrigerant flowing through the second flow passage by cooperation of the valve core component 23 and the valve port 2121.

It should be noted that, the above embodiments are only intended to describe the present disclosure, and not for limiting the technical solutions described in the present disclosure.

Although the present disclosure has been described in detail with reference to the above embodiments, it should be understood by those skilled in the art that, modifications or equivalent substitutions may be made to the present disclosure by those skilled in the art, and any technical solutions and improvements thereof without departing from the spirit and the scope of the present disclosure are deemed to fall into the scope of the claims of the present disclosure.

The invention claimed is:

1. A valve device, comprising a coil assembly and a valve component, wherein the valve component comprises a valve seat component, a rotor component, a valve core component and a sleeve, the coil assembly comprises a stator assembly, and the stator assembly is configured to drive the rotor component to rotate, the valve core component is connected to the rotor component, and the rotor component is configured to drive the valve core component to axially move relative to the valve seat component, the valve seat component comprises a valve seat sleeve and a flange portion, and a lower end opening portion of the sleeve is fixed to the valve seat sleeve by welding, the valve device further comprises a mounting block, and the valve device is mounted to other elements through the mounting block, the mounting block is further provided with a mounting hole, and a part of the valve seat component is located inside the mounting hole, wherein a hole diameter of at least a part of the mounting hole is smaller than an outer diameter of the flange portion, and the flange portion is configured to limit the mounting block from being separated from the valve seat component in a direction away from the coil assembly, the valve device further comprises a gasket, and at least a part of the gasket is radially located between the valve seat sleeve and an inner circumferential wall of the mounting hole, wherein the gasket is tightly pressed between the mounting block and the valve seat component in an interference fit to limit the valve seat component from rotating relative to the mounting block in a circumferential direction, wherein the gasket covers a position where the lower end opening portion of the sleeve and the valve seat sleeve are welded.

2. The valve device according to claim 1, wherein the gasket is in an annular cylinder shape and comprises a first gasket portion and a second gasket portion, wherein an outer diameter of the first gasket portion is larger than an outer diameter of the second gasket portion, and the first gasket portion is relatively closer to the coil assembly, the second gasket portion is embedded between the mounting block and the valve seat component in an interference fit with the mounting block and the valve seat component, wherein an inner circumferential surface of the second gasket portion is in contact with an outer circumferential surface of the valve seat sleeve, and an outer circumferential surface of the second gasket portion is in contact with the inner circumferential wall of the mounting hole.

3. The valve device according to claim 1, wherein the gasket is in an annular cylinder shape and comprises a first gasket portion and a second gasket portion, wherein an outer diameter of the first gasket portion is larger than an outer diameter of the second gasket portion, and the first gasket portion is relatively closer to the coil assembly, a part of the second gasket portion is located between the valve seat component and the mounting block, a periphery of the second gasket portion is provided with a first ridge that is arranged along an axial direction of the valve component, and a circumferential side wall of the mounting hole is provided with a first elongated groove that is arranged along the axial direction of the valve component, wherein the first ridge has a shape matching with an inner peripheral wall of the first elongated groove, the first ridge is in interference fit with the inner peripheral wall of the first elongated groove, wherein an inner circumferential surface of the gasket is in interference fit with an outer circumferential surface of the valve seat sleeve, or wherein the inner circumferential surface of the gasket is provided with a second ridge that is arranged along the axial direction of the valve component, the valve seat sleeve is provided with a second elongated groove that is arranged along the axial direction of the valve component, and the second ridge is in interference fit with an inner peripheral wall of the second elongated groove.

4. The valve device according to claim 1, wherein the gasket is in an annular cylinder shape and comprises a first gasket portion and a second gasket portion, wherein an outer diameter of the first gasket portion is larger than an outer diameter of the second gasket portion, the first gasket portion is relatively closer to the coil assembly, and a part of the second gasket portion is located between the valve seat component and the mounting block, a periphery of the second gasket portion is provided with a third elongated groove that is arranged along an axial direction of the valve component, a circumferential side wall of the mounting hole is provided with a third ridge that is arranged along the axial direction of the valve component, and the third ridge has a shape matching with an inner peripheral wall of the third elongated groove, wherein the third ridge is in interference fit with the inner peripheral wall of the third elongated groove, and an inner circumferential surface of the gasket is in interference fit with an outer circumferential surface of the valve seat sleeve, or the inner circumferential surface of the gasket is provided with a fourth elongated groove that is arranged along the axial direction of the valve component, the valve seat sleeve is provided with a fourth ridge that is arranged along the axial direction of the valve component, and the fourth ridge is in interference fit with an inner peripheral wall of the fourth elongated groove.

5. The valve device according to claim 2, wherein a lower end of the mounting block is provided with a recess portion, and a diameter of a side wall of the recess portion is larger than a smallest hole diameter of the mounting hole, at least a part of the flange portion is located in the recess portion, a top wall that of the recess portion abuts against the flange portion, a lower end face of a part of the first gasket portion that protrudes from the second gasket portion abuts against an upper end face of the mounting block to limit a relative position between the gasket and the mounting block.

6. The valve device according to claim 1, wherein the gasket comprises a large-diameter cylindrical portion and a small-diameter cylindrical portion, and the small-diameter cylindrical portion is relatively closer to the coil assembly than the large-diameter cylindrical portion, a turning portion is formed between the large-diameter cylindrical portion and the small-diameter cylindrical portion, a lower end face of the turning portion abuts against an upper end face of the flange portion, and the mounting block abuts against an upper end face of the turning portion, at least a part of the small-diameter cylindrical portion is pressed between the valve seat sleeve and the inner circumferential wall of the mounting hole in an interference fit, and at least a part of the large-diameter cylindrical portion is pressed between an outer circumferential surface of the flange portion and the inner circumferential wall of the mounting hole in an interference fit.

7. The valve device according to claim 2, wherein the valve device comprises a first sealing ring, and the first sealing ring is supported by a top portion of the gasket, the coil assembly further comprises an injection molding portion, and the injection molding portion covers at least a part of the stator assembly, wherein a lower end of the injection molding portion is provided with an annular groove portion, an annular groove is formed in the annular groove portion, and an opening of the annular groove is arranged toward the sleeve, at least a part of the first sealing ring is located in the annular groove, and the first sealing ring is tightly pressed between an inner side wall of the annular groove portion and the sleeve.

8. The valve device according to claim 7, wherein the valve device further comprises a connector, and the connector comprises a main plate portion and a side plate portion, wherein the main plate portion and the side plate portion are formed integrally, the main plate portion is fixedly connected to the coil assembly, and the side plate portion is bent from the main plate portion toward a direction away from the coil assembly, the side plate portion is provided with a first communication hole, the mounting block is provided with a first threaded hole, and the valve device is provided with a first screw assembly, wherein the first screw assembly passes through the first communication hole and is screwed into the first threaded hole on the mounting block to fixedly connect the connector and the mounting block.

9. The valve device according to claim 8, wherein the lower end of the injection molding portion is provided with a column, the main plate portion is provided with a first through hole, the column passes through the first through hole, and a part of the column that passes through the first through hole is welded to fix the main plate portion to the injection molding portion, an upper end face of the mounting block is provided with an avoidance groove, a position of the avoidance groove is in correspondence to a position of the column, and a part of the column is accommodated in the avoidance groove.

10. The valve device according to claim 9, wherein a joint between the gasket and the mounting block or a joint between the gasket and the valve component is further bonded by an adhesive or fixed by welding, or a joint between the mounting block and the valve seat component is further bonded by an adhesive.

11. An electric valve, comprising the valve device according to claim 1, wherein the electric valve further comprises a valve body, the valve body is provided with a valve body cavity, and a part of the valve device is located inside the valve body cavity, the mounting block is provided with a second communication hole, the valve body is provided with a second threaded hole, the electric valve further comprises a second screw assembly, and the second screw assembly passes through the second communication hole and is screwed into the second threaded hole on the valve body, a lower end face of the flange portion abuts against the valve body and the mounting block abuts against an upper end face of the flange portion so as to fix the valve device to the valve body.

12. The electric valve according to claim 11, wherein the valve body comprises a first flow passage and a second flow passage, and the first flow passage is in communication with the second flow passage through the valve device, the valve device is configured to regulate a flow rate of a working medium between the first flow passage and the second flow passage.

13. The valve device according to claim 3, wherein a lower end of the mounting block is provided with a recess portion, and a diameter of a side wall of the recess portion is larger than a smallest hole diameter of the mounting hole, at least a part of the flange portion is located in the recess portion, a top wall that of the recess portion abuts against the flange portion, a lower end face of a part of the first gasket portion that protrudes from the second gasket portion abuts against an upper end face of the mounting block to limit a relative position between the gasket and the mounting block.

14. The valve device according to claim 4, wherein a lower end of the mounting block is provided with a recess portion, and a diameter of a side wall of the recess portion is larger than a smallest hole diameter of the mounting hole, at least a part of the flange portion is located in the recess portion, a top wall that of the recess portion abuts against the flange portion, a lower end face of a part of the first gasket portion that protrudes from the second gasket portion abuts against an upper end face of the mounting block to limit a relative position between the gasket and the mounting block.

15. The valve device according to claim 3, wherein the valve device comprises a first sealing ring, and the first sealing ring is supported by a top portion of the gasket, the coil assembly further comprises an injection molding portion, and the injection molding portion covers at least a part of the stator assembly, wherein a lower end of the injection molding portion is provided with an annular groove portion, an annular groove is formed in the annular groove portion, and an opening of the annular groove is arranged toward the sleeve, at least a part of the first sealing ring is located in the annular groove, and the first sealing ring is tightly pressed between an inner side wall of the annular groove portion and the sleeve.

16. The valve device according to claim 4, wherein the valve device comprises a first sealing ring, and the first sealing ring is supported by a top portion of the gasket, the coil assembly further comprises an injection molding portion, and the injection molding portion covers at least a part of the stator assembly, wherein a lower end of the injection molding portion is provided with an annular groove portion, an annular groove is formed in the annular groove portion, and an opening of the annular groove is arranged toward the sleeve, at least a part of the first sealing ring is located in the annular groove, and the first sealing ring is tightly pressed between an inner side wall of the annular groove portion and the sleeve.

\* \* \* \* \*